Patented Apr. 15, 1941

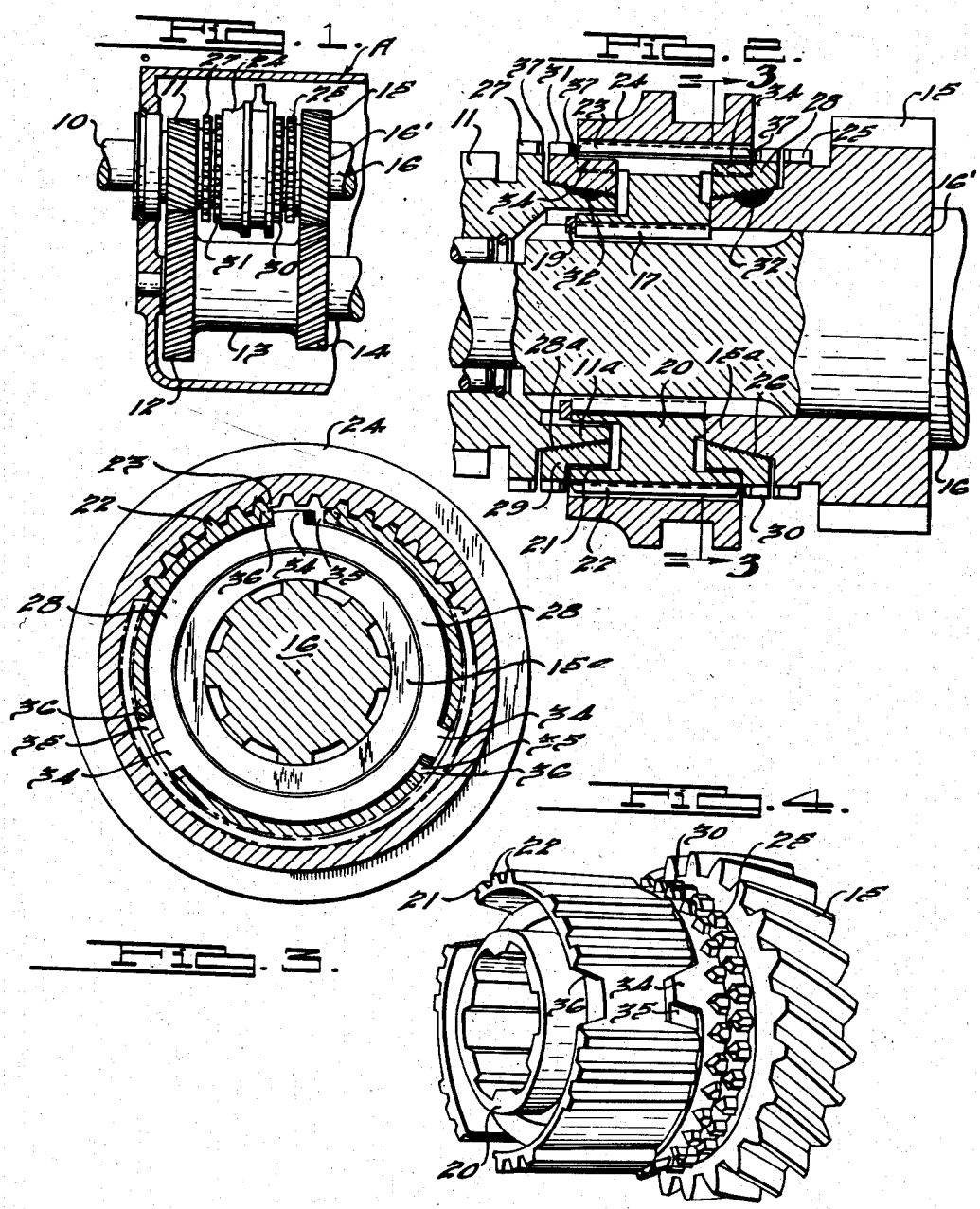

2,238,723

UNITED STATES PATENT OFFICE 2,238,723

TRANSMISSION SYNCHRONIZING MECHANISM

Otto E. Fishburn, Detroit, Mich., assignor to Chrysler Corporation, Highland Park, Mich., a corporation of Delaware Application September 30, 1939, Serial No. 297,205

15 Claims. (Cl. 192—53)

This invention relates to an improved synchronizing mechanism and more particularly to a mechanism for synchronizing parts preparatory to clutching the same together.

An object of the invention is to provide a mechanism of this type which will insure against clashing of the parts to be clutched together, and which will operate in a minimum of time to control the rotative speeds of the parts to be clutched.

Another object of the invention is to provide an improved mechanism of this character which has a self-energizing action and more particularly to provide in a synchronizing mechanism having friction clutching parts of improved means for maintaining the latter in energized relationship.

An additional object of the invention is to provide improvements of the foregoing type which are characterized by simplicity in design, and which are capable of long use without undue wear.

Other objects of the invention will be more apparent in the following description taken in connection with the accompanying drawing, in which:

Fig. 1 is a sectional elevational view of a portion of a motor vehicle transmission embodying the invention.

Fig. 2 is an enlarged fragmentary sectional elevational view of a portion of the Fig. 1 mechanism.

Fig. 3 is a transverse sectional view taken as indicated by the line 3—3 of Fig. 2.

Fig. 4 is a view in perspective of a portion of the mechanism shown in Figs. 1 and 2.

In the drawing I have illustrated my invention in connection with the second and direct speed drives of a conventional transmission A although my blocker synchronizer may be used wherever blocker clutching is desired.

The transmission comprising the usual driving shaft 10 carrying the main drive pinion 11 meshing with countershaft gear 12. The countershaft 13 carries a gear 14 meshing with the second speed gear 15 which is loose on the transmission output shaft 16 and retained against axial displacement to the right, as viewed in Fig. 1, by shoulder 16' on shaft 16.

Splined at 17 to shaft 16 and preferably fixed by ring 19 and gear 15 against movement axially of this shaft is a hub 20 having an outer annular rim 21 extending axially beyond the body portion of the hub and formed with a series of axially extending external teeth 22 engaged by the internal teeth 23 of a shift clutch member or sleeve 24.

Gear 15 has a forwardly extending portion 15ª formed with a series of external clutching teeth 25 and a friction clutching cone surface 26. Gear 11 likewise has a rear extension 11ª formed with clutching teeth 27 and cone surface 28ª, the sleeve teeth 23 being selectively engageable either with teeth 25 or 27 when the sleeve 24 is shifted rearwardly or forwardly to respectively drive shaft 16 from shaft 10 in the second or direct speed ratios.

As a means of frictionally synchronizing shaft 16 and hub 20 with gear 15 or gear 11 and preventing the positive clutching of the sleeve 24 with teeth 25 or 27 prior to synchronization, I provide blocker synchronizers in the form of rings 28, 29 respectively formed with blocker teeth 30, 31 of the same diametrical pitch as the teeth 23, 25 and 27 and respectively disposed between teeth 23 and teeth 25 and 27 as shown in Fig. 2 so that the blocker teeth will prevent shift of the sleeve until the parts to be positively clutched are synchronized.

Each blocker 28, 29 is formed with a cup 32 preferably threaded to provide a friction surface which will cut through the oil film at the cones 26, 28ª without grooving the cones as described and claimed in my copending application Serial No. 180,840, filed December 20, 1937. The threads are preferably of a left hand to assist in the release of the blockers after they perform their function. The blockers 28, 29 are respectively mounted on the cone portions of the gears 15 and 11 and are limited in their movement one toward the other by the rim 21 of the hub 20 and are movable away from each other to frictionally engage the respective cone surfaces to effect synchronization. Each blocker has an operating connection with the hub 20 and as illustrated more particularly in Fig. 3 is provided with a plurality (three being shown) of circumferentially spaced projecting stops 34, each extending with clearance 35 into an opening 36 in the adjacent portion of the rim 21 of the hub 20. While each blocker is thus drivingly connected with the hub, the clearance indicated at 35 accommodates relative rotation between the hub and each blocker. The various teeth 30, 31, 25 and 27 have their ends bevelled as at 37 for engagement with the bevelled ends of the sleeve teeth 23.

In order to insure operation of the synchronizing mechanism in a minimum of time, the blockers 28, 29 are preferably maintained in an energized position with respect to the respective cone surfaces, in which position the blocker and cone friction surfaces are engaged under relatively light pressure prior to the synchronizing action.

For the purpose of maintaining this energized position, each opening 36 is provided with tapered walls as illustrated more particularly in Fig. 4, such walls diverging outwardly with respect to the rim 21, and each projection 34 has correspondingly tapered side walls. This formation of the projections may be omitted, however, but is preferably included as it eliminates undue localized wear of the parts. When the projections of a blocker engage a wall of the respective openings receiving the same in response to rotation of the hub, the tapered wall acts on the projection to move the blocker outwardly from the hub 20 and axially with respect to the associated cone to an energized position with respect to its said cone, in which position the friction surfaces of the blocker and cone are engaged under relatively light pressure prior to placing such surfaces under relatively heavy pressure to effect the synchronizing action as will hereinafter more fully appear.

The extent to which the cooperating friction surfaces of a blocker and cone are engaged through the action of the connection as aforesaid, may be varied by varying the included angle defined by the walls of the openings 36. It will be understood, of course, that as this angle is increased there is effected an increase in the pressure under which these parts engage and that when such angle is decreased there is effected a decrease in the pressure. As an example, I have found that an included angle of thirty degrees will provide the necesesary pressure to insure the desired operation of the mechanism. When the blockers are rotated with the hub the projections on the former engage a wall of an opening 36 receiving the same so that each blocker is placed in an energized position with respect to its associated cone, as aforesaid, and the blocker teeth 30, 31 are placed in blocking position, that is axially opposite the teeth 23 of the shiftable sleeve 24. When the sleeve 24 is shifted axially to engage the teeth 25 of gear 15, for example, the teeth 23 of the sleeve engage the teeth 30 of the blocker 28 and due to the clearance between the blocker projections 34 and the walls of the opening receiving the same, the blocker is permitted to rotate relative to the hub so that the blocker teeth are moved out of blocker position, and the blocker is moved onto the cone surface so that the friction surfaces of the blocker and cone are engaged under relatively heavy pressure to effect synchronization of gear 15 and shaft 16 prior to engagement of the teeth 23 and 25.

It will be noted that the second speed gear 15 is in permanent driving engagement with the shaft 10, and the shiftable sleeve 24 may rotate faster or slower than the gear 11 or the gear 15. In either event the blocker rings 28, 29 will be rotated relative to the hub to cause the projections of the former to engage a wall of the opening receiveing the same and maintain the blockers in an energized position prior to shift of the sleeve 24 to selectively clutch with gears 11 and 15. For example, in shifting the sleeve 24 to clutch with the second speed gear 15, should the latter be rotating faster than the hub and sleeve, the blocker ring 28 will have been moved outwardly to its energized position due to rotation of the hub and sleeve, and the faster rotation of the gear 15 will cause the blocker to rotate relative to the hub, this being accommodated by the clearance such as indicated at 35. This relative rotation causes the projections of the blocker to engage the opposite wall of the openings 36 receiving the same and the blocker is thus maintained in its energized position. When the blocker ring is in either of the aforesaid positions, the teeth thereof are in blocking position with respect to the teeth of the sleeve 25. The action of the cooperating surfaces of the blockers and cones is more fully set forth in my aforesaid copending application Serial No. 180,840.

What I claim:

1. In a power transmitting mechanism, a first rotatable structure having external clutching teeth and a friction surface, a second rotatable structure having external teeth, a sleeve having internal teeth engaging the external teeth of said second structure and shiftable to clutchingly engage the teeth of said first structure to clutch said structures, a blocker member having a friction surface engageable with the aforesaid friction surface and blocker teeth axially between the teeth of said first and second structures, the ends of said blocker teeth engaging the ends of the teeth of said sleeve and preventing shift of said sleeve into said clutching engagement prior to approximate synchronization of said structures, said second structure having a slot therein and said blocker having a portion extending into said slot and engageable with a wall thereof for driving said blocker from said second mentioned structure while accommodating limited relative rotation therebetween, said wall having a tapered portion operable upon engagement with said blocker portion to urge said blocker friction surface into engagement with the friction surface of said first structure.

2. In a power transmitting mechanism, a first rotatable structure having external clutching teeth and a friction surface, a second rotatable structure having external teeth, a sleeve having internal teeth engaging the external teeth of said second structure and shiftable to clutchingly engage the teeth of said first structure, a blocker member having a friction surface engageable with the aforesaid friction surface and blocker teeth axially between the teeth of said first and second structures, the ends of said blocker teeth engaging the ends of the teeth of said sleeve and preventing shift of said sleeve into said clutching engagement prior to approximate synchronization of said structures, and a connection between said second structure and said blocker for rotatably driving the latter, said connection being operable to urge said blocker friction surface into engagement with the friction surface of said first structure.

3. In a synchronizing clutch mechanism for an automotive change speed transmission, driving means comprising two rotating structures each including a friction clutch member and a set of clutch teeth, a driven shaft adapted to be selectively clutched with said structures, a hub having a body portion carried by said shaft and a peripheral rim formed with splines extending in a direction axially of said shaft, said rim having an opening in each axially opposite edge portion thereof, a pair of synchronizing control rings respectively disposed between said hub and each of said structures, each of said rings having a tongue provided with tapered edge portions projecting with rotative clearance into an adjacent opening in said rim to rotatably connect said hub and rings while accommodating limited rotation of said rings relative to each other and relative to said hub, each of said rings having a friction clutch part engageable with one of said friction clutch members, and a shift sleeve having clutch teeth engaging the splines of said rim and adapted for shifting movement selectively in opposite directions for clutching engagement with said sets of clutch teeth, said sleeve being operable to selectively force said friction clutch parts against said friction clutch members under relatively heavy pressure to synchronize the clutch teeth of said shift sleeve with said sets of clutch teeth, opposite wall portions of each of the openings being tapered and engageable with a respective tapered edge portion of the tongue disposed therein to cause the associated friction clutch part to engage its associated friction clutch member under relatively light pressure prior to said synchronizing operation.

4. In a synchronizing clutch mechanism for an automotive change speed transmission, driving means comprising a rotating structure having a friction clutch member and a set of clutch teeth, a driven shaft adapted to be clutched with said structure, a hub carried by said shaft and having an annular body portion and a peripheral splined rim overhanging said body portion in a direction axially of said shaft and having an opening therein, a synchronizing control ring disposed between said hub and said structure and having an axially extending tongue projecting into said opening to rotatably connect said hub and ring while accommodating limited rotation of said ring relative to said hub, said ring having a friction clutch part engageable with said friction clutch member, and a shift sleeve having clutch teeth engaging the splines of said rim and adapted for shifting movement for forcing friction clutch part against said friction clutch member under relatively heavy pressure to synchronize said driving means and said driven shaft prior to clutching engagement with said clutch teeth, the wall of said opening cooperating with said tongue to cause said friction clutch part to engage said friction clutch member under relatively light pressure prior to said synchronizing operation.

5. In a synchronizing clutch mechanism, relatively rotatable parts to be clutched, clutch elements respectively driven with said parts and relatively shiftable to effect clutching engagement therebetween, friction clutching members respectively driven with said parts, one of said members including radially extending blocker means disposed between said clutch elements and preventing said clutching engagement prior to synchronization thereof, means operable for forcing one of said friction clutching members under relatively heavy pressure against the other to synchronize said parts and for subsequently shifting one of said clutch elements into engagement with the other, and means responsive to rotation of one of said parts for causing said friction clutching members to engage under relatively light pressure prior to said operation of said synchronizing means.

6. In a synchronizing clutch mechanism, relatively rotatable parts to be clutched, clutch elements respectively driven with said parts, one shiftable to clutchingly engage the other, friction clutching members respectively driven with said parts, one of said members having radially extending teeth disposed between said clutch elements and engageable with said movable element to prevent said clutching engagement prior to synchronization thereof, and means operable for forcing one of said friction clutching members under relatively heavy pressure against the other to synchronize said parts and for subsequently shifting one of said clutch elements into engagement with the other, one of said members and its said respective part including a driving connection operable in response to rotation of the last mentioned part to cause said friction clutching members to engage under relatively light pressure prior to said operation of said synchronizing means.

7. In a synchronizing clutch mechanism, relatively rotatable parts to be clutched, clutch elements respectively driven with said parts and relatively movable to effect clutching engagement therebetween, friction clutching members respectively rotatably driven with said parts, one of said members having radially extending blocker means disposed between said clutch elements and blocking said clutching engagement prior to synchronization thereof, and means operable for forcing one of said friction clutching members under relatively heavy pressure against the other to synchronize said parts and for subsequently moving one of said clutch elements into engagement with the other, one of said friction clutching members being operable in response to rotation thereof to engage the other of said members under relatively light pressure prior to said operation of said synchronizing means.

8. In a power transmitting mechanism, relatively rotatable parts to be clutched, one of said parts comprising a set of clutch teeth and a friction surface rotatable therewith, a hub structure rotating with the other of said parts, a second set of clutch teeth driven with said hub structure and adapted to be shifted toward the first said set of clutch teeth for clutching therewith, a blocker structure rotatable with said hub structure and having blocker teeth disposed between said sets of clutch teeth and engageable with said second set of clutch teeth to prevent said clutching prior to approximate synchronization of said parts, said blocker structure including a friction surface engageable with the first mentioned friction surface, and means responsive to rotation of said blocker structure for establishing frictional engagement between said friction surfaces prior to shift of said second set of clutch teeth toward the first said set of clutch teeth.

9. In a power transmitting mechanism, relatively rotatable parts to be clutched, one of said parts comprising a set of clutch teeth and a friction surface rotatable therewith, a hub structure rotating with the other of said parts, a second set of clutch teeth driven with said hub structure and adapted to be shifted toward the first said set of clutch teeth for clutching therewith, and a blocker structure including blocker teeth operable to prevent said clutching prior to approximate synchronization of said parts, said structure including a friction surface engageable with the first mentioned friction surface, said blocker structure having an operating connection with said hub operable to cause said last mentioned friction surface to establish frictional engagement with the other of said friction surfaces prior to shift of said second set of clutch teeth toward the first said set of clutch teeth.

10. In a power transmitting mechanism, relatively rotatable parts to be clutched, one of said parts comprising a set of clutch teeth and a friction member rotatable therewith, a hub structure rotating with the other of said parts, a second set of clutch teeth driven with said hub structure and adapted to be shifted toward the first said set of clutch teeth for clutching therewith, a second friction member, and means for rotatably connecting said second friction clutch member and said hub, said connecting means being operable to establish frictional engagement between said friction members prior to shift of said second set of clutch teeth toward the first said set of clutch teeth.

11. In a synchronizing clutch mechanism, relatively rotatable parts adapted to be clutched, positively engageable clutch elements respectively driven with said parts, and friction clutching members respectively driven with said parts, the driving connection between one of said parts and one of said members being operable to urge said last mentioned member into limited frictional engagement with the other of said members when said one of said parts is operable to drive said one of said members, said driving connection accommodating relative rotation between said one of said parts and said one of said members.

12. In a power transmitting mechanism including driving and driven structures, a clutching receiving the same and maintain the block- between said structures, a blocker adapted to engage one of said structures under blocker-energizing pressure and having blocker means, said blocker having an operating connection with the other of said structures accommodating limited rotation of said blocker relative to said other structure for accommodating positioning of said blocker means to block said clutching movement of said device when said structures are rotating at relatively different speeds and for disposing said blocker means out of said blocking position thereby to accommodate said clutching movement of said device when said structures are rotating at approximately the same speed, said connection being operable to urge said blocker into said blocker-energizing engagement with said one of said structures whereby to induce said positioning of said blocker means in said blocking position prior to clutching movement of said device, said blocker means being so disposed prior to said clutching movement of said device as to rotate free from engagement with the latter, and means drivingly connecting said device to one of said structures.

13. In a power transmitting mechanism including driving and driven structures, a clutching device having clutch teeth and movable to effect positive clutching between said structures, a blocker adapted to engage one of said structures under blocker-energizing pressure and having blocker means, said blocker having an operating connection with the other of said structures accommodating limited rotation of said blocker relative to said other structure for accommodating positioning of said blocker means to block said clutching movement of said device when said structures are rotating at relatively different speeds and for disposing said blocker means out of said blocking position thereby to accommodate said clutching movement of said device when said structures are rotating at approximately the same speed, said connection being operable to urge said blocker into said blocker-energizing engagement with said one of said structures whereby to induce said positioning of said blocker means in said blocking position prior to clutching movement of said device, said blocker means being so disposed prior to said clutching movement of said device as to rotate free from engagement with said clutch teeth, and means drivingly connecting said device to one of said structures.

14. In a power transmitting mechanism including driving and driven structures each having a set of clutch teeth, a clutching device drivingly connected with one of said sets of clutch teeth and movable to clutch with the other of said sets of clutch teeth to effect a driving connection between said structures, a blocker adapted to engage one of said structures under blocker-energizing pressure and having blocker teeth disposed between said sets of clutch teeth, said blocker having an operating connection with the other of said structures accommodating limited rotation of said blocker relative to said other structure for accommodating positioning of said blocker teeth to block said clutching movement of said device when said structures are rotating at relatively different speeds and for disposing said blocker teeth out of said blocking position thereby to accommodate said clutching movement of said device when said structures are rotating at approximately the same speed, said operating connection being operable to urge said blocker into said blocker-energizing engagement with said one of said structures whereby to induce said positioning of said blocker teeth in said blocking position prior to clutching movement of said device.

15. In a power transmitting mechanism including driving and driven structures each having a set of clutch teeth, a clutching device drivingly connected with one of said sets of clutch teeth and movable to clutch with the other of said sets of clutch teeth to effect a driving connection between said structures, a blocker adapted to engage one of said structures under blocker-energizing pressure and having blocker teeth disposed between said sets of clutch teeth, said blocker being rotatable with the other of said structures for positioning said blocker teeth to block said clutching movement of said device and being rotatable relative to said other structure for disposing said blocker teeth out of said blocking position to accommodate said clutching movement, and means responsive to rotation of said other structure for urging said blocker into said blocker-energizing engagement with said one of said structures prior to clutching movement of said device.

OTTO E. FISHBURN.